US012480076B2

(12) United States Patent
Li

(10) Patent No.: US 12,480,076 B2

(45) Date of Patent: Nov. 25, 2025

(54) SCENT BOOSTER

(71) Applicant: Givaudan SA, Vernier (CH)

(72) Inventor: Xuejing Li, Shanghai (CN)

(73) Assignee: Givaudan SA, Vernier (CH)

( * ) Notice: Subject to any disclaimer, the term of this patent is extended or adjusted under 35 U.S.C. 154(b) by 501 days.

(21) Appl. No.: 17/996,458

(22) PCT Filed: Apr. 20, 2021

(86) PCT No.: PCT/EP2021/060149

§ 371 (c)(1),
(2) Date: Oct. 18, 2022

(87) PCT Pub. No.: WO2021/214009

PCT Pub. Date: Oct. 28, 2021

(65) Prior Publication Data

US 2023/0193164 A1 Jun. 22, 2023

(30) Foreign Application Priority Data

Apr. 22, 2020 (WO) ................ PCT/CN2020/086027

(51) Int. Cl.
*C11D 3/50* (2006.01)
*C11D 17/04* (2006.01)

(52) U.S. Cl.
CPC ............ *C11D 3/505* (2013.01); *C11D 17/045* (2013.01); *C11D 2111/12* (2024.01)

(58) Field of Classification Search
CPC ... C11D 3/505; C11D 17/045; C11D 2111/12; C11D 3/50
See application file for complete search history.

(56) References Cited

U.S. PATENT DOCUMENTS 4,446,032 A * 5/1984 Munteanu .............. C11D 3/505 428/905
2005/0079991 A1 * 4/2005 Ranade .................. C11D 3/505 510/457
2006/0205617 A1 * 9/2006 Holzner ............... C11D 17/042 510/101
2014/0323383 A1 10/2014 Trujillo et al.
2017/0175057 A1 * 6/2017 Depoot .................... C11D 1/83
2017/0369824 A1 12/2017 Sunder et al.

FOREIGN PATENT DOCUMENTS

CN 110760395 A 2/2020
EP 1208754 A1 5/2002
EP 1905818 A1 4/2008
EP 3181673 A1 6/2017
EP 3181680 A1 6/2017
WO 2004020566 A1 3/2004
WO 2004083356 A1 9/2004
WO 2011056938 A1 5/2011
WO 2011094687 A1 8/2011
WO 2016003699 A1 1/2016

OTHER PUBLICATIONS

International Search Report for Application No. PCT/EP2021/060149 dated Jun. 24, 2021.
Written Opinion for Application No. PCT/EP2021/060149 dated Jun. 24, 2021.
International Search Report for Application No. PCT/CN2020/086027 dated Dec. 30, 2020.
Written Opinion for Application No. PCT/CN2020/086027 dated Dec. 30, 2020.

* cited by examiner

*Primary Examiner* — Cephia D Toomer
(74) *Attorney, Agent, or Firm* — Curatolo Sidoti & Trillis Co., LPA; Floyd Trillis, III; Salvatore A. Sidoti

(57) ABSTRACT

A scent boosting composition comprising both a liquid fragrance composition and a water-disintegrate particulate fragrance composition each of which is enclosed in separate compartments of a single water-soluble envelope, the particulate fragrance composition comprising a solid component and a fragrance component.

The composition provides to washed fabrics in a washing machine, both an immediate fragrance and an enduring fragrance.

14 Claims, No Drawings

SCENT BOOSTER

CROSS REFERENCE TO RELATED APPLICATIONS

This application is a national stage application of International Application No. PCT/EP2021/060149, filed 20 Apr. 2021, which claims priority from International Application No. PCT/CN2020/086027, filed 22 Apr. 2020, both of which applications are incorporated herein by reference.

This disclosure relates to the fragrancing of laundry, and to products for achieving this.

It has long been desired to impart to washed fabrics a long-term fragrance. Fragrances incorporated into a wash liquor, either alone or as part of a washing product, such as a detergent or a fabric conditioner or softener, will have an immediate olfactory impact. In a more recent development, there have been provided so-called scent boosters. These are typically in the form of small, water-soluble solid particles containing fragrance that release the fragrance on dissolving in the wash liquid. They are available in a number of different forms. For example, they may be droplets of fragrance dispersed in particles of a water-soluble polymer, such as polyethylene glycol, or in particles of a solid soap. Another variety is fragrance droplets deposited on a water-soluble crystalline material, such as a salt, and then coated with a protective coating. Sodium chloride is a commonly-used crystalline material and silica a common coating.

A common method of imparting a long-term fragrance to washed fabrics has been the use of fragrance-containing microcapsules. The microcapsules are commonly incorporated into a washing product, and they adhere to the fabric, remaining there after drying. They are sufficiently robust to survive the washing process itself, but are sufficiently frangible, such that rubbing will cause breakage and release the fragrance. Some fragrance boosters also have included fragrance-containing microcapsules to help achieve both immediate and long-lasting fragrance effects.

It has now been found that it is possible to achieve both an immediate olfactory impact and a long-lasting olfactory impact in a single convenient package. There is therefore provided a scent boosting composition comprising both a liquid fragrance composition and a water-disintegration particulate fragrance composition, each of which is enclosed in separate compartments of a single water-soluble envelope, the particulate fragrance composition comprising a solid component and a fragrance component.

The use of such a formulation enables in one convenient package an immediate fragrancing of the washed fabrics by the liquid fragrance composition, plus an enduring (long lasting) fragrance supplied by the particulate fragrance composition, which remain attached to the washed fabrics after drying. The disclosure therefore also provides a method of providing to fabrics in a wash liquor in a washing machine both an immediate fragrance and a long-lasting fragrance, comprising the addition to the wash liquor of a scent-boosting composition as hereinabove described.

The idea of using a water-soluble envelope as a container for material added to a wash is well known from the "unidose" forms of washing detergent widely available, in which a single wash-sized dose of detergent is packed in a water-soluble envelope. This saves the necessity to meter out a particular dose of washing detergent and avoids the possibility of messy spills. However, the concept and inherent advantages of using such a form for a scent booster are not known.

By "particulate fragrance composition" is meant a fragrance-containing composition rendered in solid, particulate form, generally in the form of a powder. Such particles comprise a solid component and a fragrance component, the solid component acting as a carrier for the fragrance component. Such particles can be prepared by any convenient means, some specific (but non-limiting) embodiments of which are further described hereinunder.

The solid particulate fragrance composition is water-disintegrable, by which is meant that the individual solid particles dissolve or break down in water to release the fragrance. The nature of the solid component of the particles is not critical, provided they disintegrate in the presence of water to release the fragrance contained therein. For example, the solid component may be completely water-soluble. Alternatively, it may comprise material that is inherently water-insoluble, such as fine particle-size silica.

One type of particulate fragrance composition that utilizes silica is that described in International Publication WO 2004/083366, in which fragrance is encapsulated by a combination of fine, porous silica and a water-soluble salt.

In a further embodiment, the particles are particles of solid, water-soluble material with inclusions of fragrance therein. These may be formed, for example, by spray drying. In a typical example, fragrance is emulsified in water that also contains a suitable carrier, such as starch, the resulting mixture then being spray-dried to form fragrance-containing granules.

In another process, core particles are suspended on a heated fluidized bed, and an emulsion of fragrance with a suitable dissolved binder is then sprayed on the suspended core particles. The core particles serve merely to act as supportive cores and can therefore be selected from any suitable material, for example, corn starch.

The fragrance in the particles may be free fragrance, or it may be fragrance in microencapsulated form, or in both of these forms. By "microencapsulated form" is meant that droplets of fragrance are surrounded by solid walls. Such microcapsules typically range in size from 5 to 500 micrometres. The technology behind fragrance-containing microcapsules and their preparation is well known and much used, and any known microcapsules are suitable for use in the compositions of this disclosure. Typical examples of suitable microcapsules are those with shells of acrylic polymer, polyurea and aminoplast polymer, such as urea- and melamine-formaldehyde. Natural and biodegradable materials such as gelatin, optionally crosslinked, may also be used. These are well known to the art and may be prepared by any of the known methods.

In a particular embodiment, fragrance-containing microcapsules with walls of biodegradable materials, such as gelatin, are dispersed within a biodegradable solid material such as starch, optionally with free fragrance droplets also encapsulated within.

Another type of particle is provided by the addition of a desiccating material capable of absorbing water to a typical aqueous slurry of microcapsules, in sufficient quantity to produce a dry material. Typical suitable desiccating materials include porous silica, various minerals such as bentonite and zeolite and water-soluble starch, porous silica being especially effective. When the water has been completely absorbed, the dry material is sieved to provide a suitable particle size.

The silica may be, for example, precipitated silica or fumed silica. These are readily commercially available, for example, the Sipernat™ range of Evonik. A typical example of a water-soluble alkali metal salt is sodium sulphate, a common ingredient in many laundry detergents. Another is sodium chloride. The granules may additionally contain other soluble or insoluble substances such as fillers and extenders. Typical examples of such materials include minerals such as bentonite and zeolite. Such granules are prepared by simply mixing an aqueous slurry of microcapsules, silica and salt and then sieving to a suitable particle size.

A further type of particle is that described in International Publication WO 2018/172514. In this case, a microcapsule slurry and a solution of a water-soluble polymer are mixed and spray-dried to create water-soluble particles containing the microcapsules. In a particular embodiment, the water-soluble polymer is a water-soluble starch. Any water-soluble, food grade starch may be used, for example Capsul™ from Ingredion, a modified food starch derived from waxy maize. Another is maltodextrin, a partially hydrolysed vegetable starch, particularly one with a dextrose equivalent of from 10-20 more particularly from 12-18.

In a further embodiment, the starch previously described may be partially replaced by other water-soluble materials. One such material is mannitol, a sugar alcohol used as a sweetener. From 10%-40% by weight of the starch may be replaced by mannitol.

The fragrance for use in the solid fragrance composition of this disclosure may be any fragrance suitable for the purpose. It is known that certain forms of microencapsulation impose certain limitations on the fragrances that can be microencapsulated, but these limitations are well known and the skilled person can allow for this. Given this possible restriction, the fragrance used in the microcapsules, and, if present, any non-encapsulated fragrance may be the same or different, depending on the hedonic effect desired. The product allows for a considerable variety of hedonic effect.

In a second compartment, there is contained a liquid fragrance composition. This fragrance composition may be any desired fragrance, or it may be any such fragrance dissolved or dispersed in a water-miscible, but non-aqueous solvent that will have little or no deleterious effect on the envelope material. Suitable examples of such solvents include common fragrance solvents such as dipropylene glycol, glycerol, propyl glycol, triacetin and triethyl citrate. Non-ionic surfactant may also be added, typical example being alcohol ethoxylates such as the Neodol™ range of Shell and the Dehydol™ range of BASF. The weight proportion of fragrance in this solution is from 0.1-50%. The solution may optionally contain nonionic surfactant.

The fragrance of the liquid fragrance composition may be the same as the fragrance in the particulate fragrance composition, or it may be different.

The envelope within which the particulate fragrance composition and the liquid fragrance composition are housed may be any suitable material. For example, materials useful for the preparation of unidose detergent compositions may also be used here. A typical example is poly(vinyl alcohol), but other water-soluble materials such as gelatin may also be used. The methods by which such envelopes are made are well known and described for example in U.S. Pat. No. 4,844,828 and European patent 2508436.

Other additives in the compartments include preservatives and colouring matters such as pigments and dyestuffs.

The particulate fragrance and liquid fragrance compositions may be packed in the compartment or compartments of water-soluble material by known methods.

When added to a wash, the envelope material will dissolve, releasing both liquid fragrance and particulate fragrance compositions into the wash. The liquid fragrance composition will provide an immediate olfactory impression. The particulate fragrance composition will then disintegrate, releasing the fragrance contained therein, providing a longer-lasting olfactory effect. If the particulate fragrance composition comprises microcapsules, these will attach to the washed fabrics. The ability of the microcapsules to remain on the washed fabrics may be augmented by treating the microcapsules with suitable surface modifiers to render them more substantive to the articles of the wash. Typical examples of such modifiers include non-ionic polysaccharides, such as mannan, glucan, glucomannan, xyloglucan, hydroxyalkyl cellulose, dextran, galactomannan, and mixtures thereof.

The disclosure is further described by reference to the following examples, which depict specific embodiments, and which are not intended to be in any way limiting on the scope of the disclosure. All quantities are by weight.

EXAMPLE 1

This describes the preparation of a two-compartment envelope (a) Preparation of Liquid Fragrance Composition.

| | Formula A | Formula B |
|---|---|---|
| Liquid fragrance | 16 | 12 |
| Surfactant (Neodol ™ 91-8E) | 8 | 6 |
| Solvent, dipropylene glycol | 76 | 82 |
| Total | 100 | 100 |

The fragrance was mixed with the surfactant. The solvent was then added and mixed well.

(b) Preparation of Solid Fragrance Composition, Utilising Silica.

An aqueous slurry of fragrance-containing aminoplast microcapsules was prepared by the method described in International Publication WO 2008/098387. The slurry had a microcapsule weight solids content of 45%.

The microcapsule slurry was sprayed on to silica, the mixture was mixed and sodium sulfate was then added and mixed well. The weight proportions of components in the mixture were as shown in the following table

| Ingredients | Formula C | Formula D |
|---|---|---|
| microcapsule slurry | 5 | 7.5 |
| Silica (Sipernat ™ 22) | 3 | 4.5 |
| sodium sulphate | 92.0 | 88.0 |
| TOTAL AMOUNT | 100.00 | 100.00 |

The components were mixed well and sieved with a 20 mesh sieve.

(c) Preparation of Solid Fragrance Composition, Utilising Starch

| Ingredients | |
|---|---|
| microcapsule slurry | 10% |
| Fragrance | 10% |
| Starch (Capsul ™) | 10% |
| Mannitol | 20% |
| Water | 50% |

Starch and mannitol were added to water at 60° C. to make a water phase. Fragrance was then added to this water phase and it was homogenized to make an emulsion. The microcapsule slurry was added to this emulsion and mixed well. The mixture was then spray-dried to form solid particles, using a GEA Niro Mobile Minor spray drier, with the following parameters:

The spray droplet size was to be between 0.5 and 2 μm (controlled by dynamic light scattering)

Inlet Temperature: 190° C.

Outlet Temperature: 90° C.

The result is a dry powder. This powder was then mixed with sodium sulphate, sieved with a 20 mesh sieve.

| Ingredients | Formula E |
|---|---|
| Spray-dried capsules in starch matrix(powder) | 5% |
| sodium sulphate | 95% |

(d) Preparation of Water-Soluble Envelope.

An envelope with two chambers was prepared by standard methods from poly(vinyl alcohol) film. The two chambers were loaded with combinations of ingredients, as shown in the following table.

| | Sample 1 | Sample 2 | Sample 3 |
|---|---|---|---|
| Formula A | 7.5 g | 7.5 g | |
| Formula B | | | 10 g |
| Formula C | 7.5 g | | |
| Formula D | | | 5 g |
| Formula E | | 7.5 g | |
| Total | 15 g | 15 g | 15 g |

(e) Wash Test and Evaluation.

The envelope prepared in (d) was added to a top-loading washing machine with a standard washing load of 1 kg terry toweling and a cotton T-shirt. 20 g liquid detergent was added to a wash liquid of 25 L water. The wash cycle consisted of a room-temperature wash cycle and two rinse cycles. The toweling was allowed to dry on a washing line.

For comparison, the same wash and dry cycle was performed with the envelope being replaced by 15 g of a commercially-available scent booster (Downy™ Unstoppable™ ex Procter & Gamble), known to contain fragrance-containing microcapsules. Two different varieties of this scent booster were tested.

The towelling and the T-shirt were evaluated by a panel of trained sensory evaluation experts who assessed the fragrance at the following points:

Wash cycle finished, wet

Washing line dried, before rubbing

Washing line dried, after rubbing

Evaluation scale was on a 1-5 scale, as follows

0—no fragrance intensity,

1—very weak fragrance intensity,

2—weak fragrance intensity,

3—moderate fragrance intensity,

4—strong intensity.

5—very strong intensity

The following results were observed:

| | | After Dry/ Before rub | | After Dry/ with rub | |
|---|---|---|---|---|---|
| Product | Wet | Towel | Cloth | Towel | Cloth |
| Downy ™ Unstopable ™ Green | 4 | 2.5 | 2.5 | 3 | 3 |
| Downy ™ Unstopable ™, Rose | 3.5 | 2 | 2.5 | 3 | 3 |
| Sample 1 | 4 | 2.5 | 3 | 3.5 | 4 |
| Sample 2 | 4 | 2.5 | 3 | 3.5 | 4 |
| Sample 3 | 4 | 2 | 3 | 3.5 | 4. |

The fragrance booster prepared according to this description was found to be at least as effective as the highly-regarded commercial product, but was much more convenient in use.

The invention claimed is:

1. A scent boosting composition comprising a liquid fragrance composition and a water-disintegrable particulate fragrance composition enclosed in separate compartments of a single water-soluble envelope, wherein the water-disintegrable particulate fragrance composition comprises a solid component comprising water-insoluble material and a fragrance component, and wherein the particulate fragrance composition comprises a mixture of fragrance-containing microcapsules and a desiccating material.

2. The scent-boosting composition according to claim 1, wherein the desiccating material is silica.

3. A method of providing to fabrics in a wash liquor in a washing machine both an immediate fragrance and a long-lasting fragrance comprising adding to the wash liquor the scent-boosting composition according to claim 1.

4. The scent-boosting composition according to claim 1, wherein the water-disintegrable particulate fragrance composition is formed by spray drying.

5. The scent-boosting composition according to claim 1, wherein the fragrance component comprises at least one of free fragrance and microencapsulated fragrance.

6. The scent-boosting composition according to claim 5, wherein the fragrance component comprises both free fragrance and microencapsulated fragrance, and wherein the free fragrance and microencapsulated fragrance are the same or different.

7. The scent-boosting composition according to claim 1, wherein the liquid fragrance composition and the water-disintegrable particulate fragrance composition have the same or different fragrance.

8. The scent-boosting composition according to claim 1, wherein the water-soluble envelope comprises at least one of polyvinyl alcohol and gelatin.

9. The scent-boosting composition according to claim 1, wherein the water-disintegrable particulate fragrance composition is in the form of a powder.

10. The scent-boosting composition according to claim 1, wherein the microencapsulated fragrance is treated with at least one surface modifier.

11. The scent-boosting composition according to claim 10, wherein the surface modifier comprises non-ionic polysaccharides, glucan, glucomannan, xyloglucan, hydroxyalkyl cellulose, dextran, and galactomannan.

12. The scent-boosting composition according to claim 1, wherein the microencapsulated fragrance comprises biodegradable materials.

13. A scent boosting composition comprising a liquid fragrance composition and a water-disintegrable particulate fragrance composition enclosed in separate compartments of a single water-soluble envelope, wherein the water-disintegrable particulate fragrance composition comprises a solid component and a fragrance component, and wherein the liquid fragrance composition comprises at least one of a non-ionic surfactant and a fragrance dissolved or dispersed in a water-miscible, non-aqueous solvent.

14. The scent-boosting composition according to claim 13, wherein the solvent is at least one of dipropylene glycol, glycerol, propyl glycol, triacetin, and triethyl citrate.

* * * * *